United States Patent [19]

Miller et al.

[11] Patent Number: 5,275,743
[45] Date of Patent: Jan. 4, 1994

[54] FILTER AND FILTRATION METHOD

[75] Inventors: John D. Miller, Ithaca; Richard C. Stoyell, Moravia; James T. Connors, Jr., Groton, all of N.Y.

[73] Assignee: Pall Corporation, Glen Cove, N.Y.

[21] Appl. No.: 804,370

[22] Filed: Dec. 10, 1991

[51] Int. Cl.⁵ .............................................. B01D 27/06
[52] U.S. Cl. ...................... 210/767; 210/492; 210/493.5; 210/509
[58] Field of Search ................. 210/489, 493.1, 493.2, 210/493.5, 504, 505, 509, 767, 493.3, 493.4, 492, 497.01, 499, 485; 55/521

[56] References Cited

U.S. PATENT DOCUMENTS

| | | | |
|---|---|---|---|
| 4,089,783 | 5/1978 | Holyoak | 210/493.1 |
| 4,479,874 | 10/1984 | Rosenberg et al. | 210/492 |
| 4,726,901 | 2/1988 | Pall et al. | 210/496 |
| 4,734,208 | 3/1988 | Pall et al. | 210/767 |

*Primary Examiner*—Matthew O. Savage
*Attorney, Agent, or Firm*—Leydig, Voit & Mayer

[57] ABSTRACT

A filter for filtering a highly viscous material comprises a filter element including a glass fiber filter medium, preferably resin-bonded, having upstream and downstream sides and a polymeric mesh situated on at least one of the upstream and downstream sides of the filter medium, and preferably on both sides of the filer medium. A non-woven sheet, such as a cellulose paper sheet, may be disposed between the downstream side of the filter medium and the downstream polymeric mesh. The filter element is typically cylindrical and longitudinally pleated to maximize the filtration area in as small a volume as possible. Also provided is a method of filtering a highly viscous material, particularly magnetic coating mixes.

29 Claims, 2 Drawing Sheets

FILTER AND FILTRATION METHOD

TECHNICAL FIELD OF THE INVENTION

The present invention relates to a filter and related filtration method, and, more particularly, to a cylindrical pleated filter having a fine removal rating with a low resistance to flow. Such a filter also has a high dirt capacity and is most suitable for the filtration of magnetic recording coating mixes.

BACKGROUND OF THE INVENTION

There is a continuing need for filters which are capable of removing finer contaminants while not increasing the flow resistance and limiting dirt capacity. This need is nowhere more pronounced than in magnetic recording technology. Magnetic recording technology is steadily moving in the direction of greater record density on devices such as computer memory disks and magnetic tape. The manufacturing processes for devices of these higher densities require finer filtration devices while not adversely affecting current filter flow resistance and dirt capacity values.

Magnetic recording devices are manufactured by coating a substrate with a layer of fine particles which can be magnetized by the recording device to preserve certain information. To deposit the layer of particles, a mix of adhesive, solvent, and magnetic particles is applied to the surface of the substrate. The coating mix typically contains aromatic solvents, such as THF, toluene, MEK, and cyclohexane, and are highly viscous. In manufacturing higher density recording devices, the particles must be smaller, and the deposited particle layer must be very uniform.

To achieve a uniform particle layer, it is essential that all impurities, gels, agglomerates, and the like be removed from the coating mix before application to the substrate. The removal is typically accomplished by passing the coating mix through a filter immediately prior to applying it to the substrate. The characteristics of the filter must be such that all contaminates are removed, but the passage of the coating particles is maximized. For economical manufacturing, the rate at which the magnetic coating mix will flow through the filter under a given propelling pressure, or the resistance to flow at a given flow rate, and the volume of coating mix which can be filtered before the filter plugs with contaminants are important filter performance parameters.

For general use magnetic video tape, for example, filters rated for removal of contaminants larger than 5-10 micrometers are normally used for final filtration of the magnetic coating mix. Such filter elements are typically cylindrical depth filters constructed of wound fibers or melt-blown filaments. Filters constructed of pleated paper of plastic fibers, such as polypropylene, are also used in the industry. For more recent magnetic recording devices such as high density memory disks and high band video tape, final filters rated for removal of particulates of 5 micrometers or smaller are required. Cylindrical filters with finer removal ratings can be used, but they have a correspondingly higher resistance to flow, and, consequently, more filters arranged in parallel are required to permit proper operation of batch coating processes.

Accordingly, a filter is desired which is capable of finer filtration while having a low resistance to flow and a high dirt capacity. Such a filter should preferably be capable of filtering contaminants from magnetic coating mixes of approximately 5 micrometers or less and, most preferably, less than approximately 3 micrometers.

SUMMARY OF THE INVENTION

It is an object of the present invention to provide a filter capable of fine filtration with a low resistance to flow.

It is another object of the present invention to provide a filter having a high dirt capacity.

It is a further object of the present invention to provide a filter and filtration method suitable for removing particulates of about 3 micrometers or less from magnetic coating mixes, while maintaining a commercially acceptable low resistance to flow and high dirt capacity.

These and other objects and advantages of the present invention will be apparent from the description of the present invention set forth herein.

The present invention provides for a filter and a method for filtering a highly viscous fluid. The filter comprises a pleated filter element including a glass fiber filter medium, preferably resin-bonded, having upstream and downstream sides and a polymeric mesh situated on at least one of the upstream and downstream sides of the filter medium. Preferably, there are two polymeric meshes, one on either side of the filter medium. Most preferably, the filter also comprises a non-woven sheet, such as a cellulose paper sheet, between the downstream side of the filter medium and the downstream polymeric mesh. While the filter may be in any suitable configuration, it will typically take the form of a cylindrical filter wherein the filter medium, polymeric meshes, and non-woven sheet are pleated to maximize the filtration area in as small a volume as possible.

DESCRIPTION OF THE PREFERRED EMBODIMENTS

Figure 1:
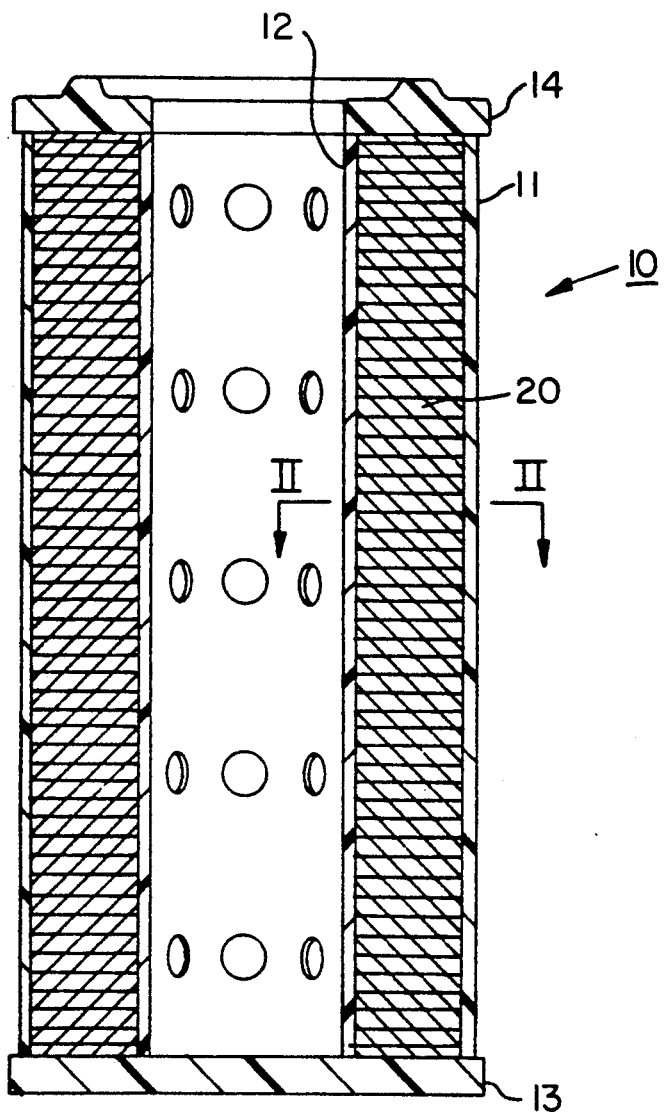
FIG. 1 is a cross-sectional elevation of a preferred embodiment of the filter of the present invention.

The present invention concerns a filter comprising a pleated filter element including a glass fiber filter medium having upstream and downstream sides and a polymeric mesh situated on at least one, and preferably both, of said upstream and downstream sides of said filter medium.

The filter medium is comprised of glass fibers which are secured to each other in any suitable manner, preferably through a suitable resin binding composition. Preferred resin-bonded glass fiber filter media are described in U.S. Pat. No. 4,734,208, which is incorporated herein by reference, and are commercially available from Pallflex Products (Putnam, Conn.). The filter medium may have any desired pore rating, but, in connection with the filtration of magnetic coating mixes, the filter medium preferably has a pore rating of approximately 10 micrometers or less, more preferably approximately 5 micrometers or less, and most preferably approximately 3 micrometers or less.

The polymeric mesh is made of any suitable polymeric filaments or strands of any suitable diameter. The polymeric strands are preferably made of a polyolefin, polyamide, or polyester, most preferably polypropylene, although any suitable material may be used so long as the material does not adversely affect the filtration process, for example, by reacting with the material being filtered or leaching undesirable contaminants. The thickness of the polymeric mesh will typically range up to about 0.02 inch with a weight ranging up to about 6 ounces/square yard, but preferably the polymeric mesh will have a thickness of about 0.01 inch and weigh about 1-2 ounces/square yard.

The polymeric mesh will generally comprise two sets of parallel strands intersecting each other at angles up to 90°, e.g., at angles of 30°, 45°, or 60°. The two sets of parallel strands preferably intersect each other at angles of from about 30° to about 90°, most preferably at angles of from about 55° to about 90°. Any suitable strand density may be employed, and such strand density may vary in direction. The polymeric mesh will typically have between about 15 and about 50 strands per inch, preferably between about 25 and about 40 strands per inch. Suitable polymeric meshes for use in the context of the present invention are commercially available from Nalle Plastics (Austin, Tex.) under the trademarks Naltex® and Zicot® in symmetrical form wherein two sets of parallel polypropylene strands intersect each other at an angle of about 90° and in non-symmetrical form (under the name Ultraflo) wherein two sets of parallel polypropylene strands intersect each other at an angle of about 35°.

The polymeric mesh may be symmetrical or non-symmetrical and the strands can be oriented in any direction. However, the strands are preferably oriented such that when the filter element is pleated and the strands of the polymeric mesh are folded over against themselves within a pleat, the opposing strands are biased or extend diagonally (at an angle of greater than 0° and less than 90°) with respect to the longitudinal axis of the pleat, preventing the opposing strands from nesting within one another and interfering with the filtration process. For example, in a non-symmetrical polymeric mesh, the strands may be oriented such that one set of parallel strands is parallel to the machine direction in which the polymeric mesh was manufactured. In such an orientation, the number of strands per inch in the machine direction is preferably lower than the number of strands in the transverse direction wherein the strand count is measured perpendicular to the strand direction. For example, a polymeric mesh may comprise two sets of parallel polypropylene strands intersecting at about a 35° angle with 26 strands per inch in the machine direction and 31 strands per inch in the transverse direction.

While a single polymeric mesh can be used, preferably on the upstream side of the filter medium, a polymeric mesh is preferably located on both the upstream and downstream sides of the filter medium. A non-woven sheet, such as of cellulose paper or polymeric fibers, may also be used in conjunction with the filter medium. Optimally, the present invention comprises a filter medium with a polymeric mesh on both the upstream and downstream sides of the filter medium and a non-woven sheet, preferably a cellulose paper sheet, on the downstream side between the filter medium and downstream polymeric mesh. The non-woven sheet in the downstream position assists in ensuring that any abrasion between the filtered material and the filter medium does not result in the addition of impurities to the filtered material. The polymeric mesh and non-woven sheet are preferably as smooth as possible to reduce abrasion between them and the filter medium, thereby extending the lifetime of the filter and minimizing the introduction of potential contaminants into the filtered material.

The filter of the present invention may also contain other layers in addition to the filter medium, polymeric meshes, and non-woven sheet, such as retaining elements (a perforated cage and a perforated core, for example) to maintain the shape of the composite layers and cushioning layers to minimize abrasion between the layers. Such a cushioning layer is preferably formed of a thin, very porous material. For example, the cushioning layer preferably has a thickness of less than approximately 100 micrometers. It is also preferably formed of a smooth material which is tough. For example, a cushioning layer may be a non-abrasive, non-woven material with a high tensile strength, such as a wet-laid polyester non-woven material available from Hirose Corporation, imported into the U.S. by Mitsubishi International Corporation (New York, N.Y.) under the trade designation 05TH08. Other preferred materials include a nylon non-woven material available from Fiberweb North America, Inc. (Milford, N.J.) under the trade designation Cerex and a non-woven polyester material available from Reemay Corporation (Old Hickory, Tenn.) under the trademark Reemay®, such as Reemay® 2006 and Reemay® 2250.

The filter of the present invention may be in any configuration suitable for its intended purpose. In filtering magnetic coating mixes and the like, the filter will usually be in a cylindrical configuration, particularly with the filter medium being pleated in order to maximize the filtration surface while maintaining a small overall filter volume. In such a configuration, the pleats of the filter medium, polymeric meshes, and/or non-woven sheet will extend perpendicularly from the longitudinal axis of the cylindrical configured filter. One set of parallel strands of the polymeric meshes is preferably oriented planar perpendicular to the longitudinal axis of the cylindrical configured filter. With respect to non-symmetrical polymeric meshes, the set of parallel strands in the machine direction is the set of strands preferably oriented planar perpendicular to the longitudinal axis of the cylindrical configured filter such that the polymeric meshes are pleated in the machine direction in which the polymeric meshes were manufactured so as to ensure that the strands on the bias (i.e., those intersecting the strands oriented in the machine direction) are folded over against themselves in opposite directions within the pleats, thereby preventing the nesting of adjacent strands along the pleat direction which might otherwise interfere with the filtration process.

The invention may be further understood with reference to the accompanying drawings wherein illustrative and preferred embodiments of the present invention are shown.

As shown in FIG. 1, the present inventive filter 10 is depicted in a preferred embodiment. The filter 10 is in a cylindrical configuration with the filtering composite 20 having been pleated around a cylindrical central space. The pleats of the filtering composite 20 extend perpendicularly from the longitudinal axis of the cylindrical configured filter 10 such that the peaks of the pleats form axes parallel to the longitudinal axis of the cylindrical configured filter 10. Optional outer and inner retaining elements in the form of a perforated cage 11 and a perforated core 12 maintain the cylindrical and pleated configuration of the filter 10, particularly during variances in filtration flow, while also providing easy handling of the filter 10. Such retaining elements preferably do not act as filtration media and can be made of any suitable material having sufficient rigidity and porosity, such as perforated metals and synthetic and natural polymers.

A blind end cap 13 and an open end cap 14 may be fitted over the two ends of the filter 10 to direct the material to be filtered through the filter 10. Alternatively, both end caps can be open or can include connectors to link a stack of filters. The end caps may be fashioned from any suitably impervious material, such as a metallic or polymeric material, which is compatible with the material to be filtered. The end caps may be secured to the ends of the filter 10 by any suitable means, including a bonding agent such as an adhesive or a potting compound. The end caps may also be melt-bonded to the ends of the filter 10 or joined by means of spin bonding or sonic welding. The ends of the cage 11 and the core 12 may be secured to the end caps 13 and 14 by similar means.

Figure 2:
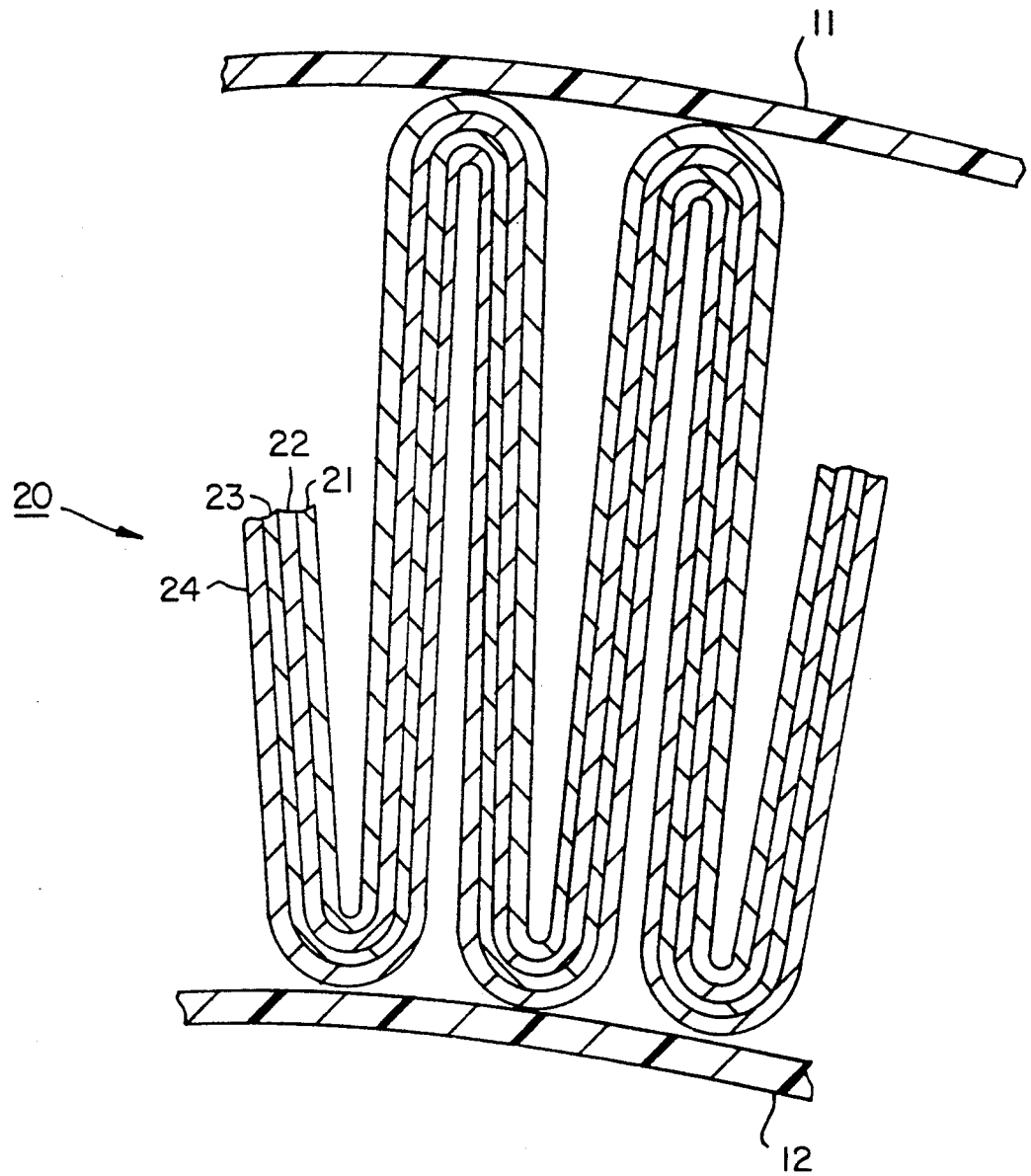
FIG. 2 is a transverse cross-sectional view of a sector of the filter of FIG. 1 taken along Line II—II.

As shown in FIG. 2, which is a transverse cross-sectional view of a sector of the filter of FIG. 1 taken along Line II—II, the filter composite 20 comprises an upstream polymeric mesh 21, a filter medium 22, a nonwoven sheet 23, and a downstream polymeric mesh 24. While the filter composite layers are depicted in a outward-to-inward radial filtration scheme, the filter composite layers can be reversed to provide for inward-to-outward radial filtration.

The filter of the present invention is particularly suitable for filtration of a highly viscous fluid such as a highly viscous magnetic coating mix. Here, a highly viscous fluid refers to one having a viscosity of greater than approximately 50 centipoise, where the viscosity may be measured in any suitable manner, such as by use of a rotational viscometer. The filter of the present invention can of course be used to filter coating mixes of viscosity lower than 50 centipoise, but it is in the high viscosity range of greater than approximately 50 centipoise in which the advantages of the present filter are most significant, and the higher the viscosity of the coating mix being filtered, the more pronounced is the superiority of the filter according to the present invention over conventional filters. Typical coating mixes have a viscosity in the range from approximately 50 centipoise to approximately 1,000 centipoise, although the filter according to the present invention can easily filter mixes having even greater viscosity.

The following examples are offered by way of illustration, rather than limitations, of the present invention.

EXAMPLE 1

A filter in accordance with the present invention was prepared substantially as shown in FIG. 1. The filter medium was a glass fiber filter medium as generally described in U.S. Pat. No. 4,734,208 and was rated for the removal of particulates of approximately 3 micrometers or greater. The polymeric meshes on the upstream and downstream sides of the filter medium were non-symmetrical biased polypropylene meshes which were 0.013 inch thick, weighed approximately 1.29 ounces/square yard, and had 26 strands per inch in the machine direction and 31 strands per inch in the transverse direction (wherein the strand count is measured perpendicular to the strand direction). The two sets of parallel strands intersected each other at an angle of about 35°±5°. Such polymeric meshes are commercially available as Naltex ® Zicot ® Ultraflo filtration net from Nalle Plastics (Austin, Tex.). A D4D cellulose paper sheet of 4 mils thickness manufactured by Aldine Technologies Inc. (New York, N.Y.) was placed between the downstream side of the filter medium and the polymeric mesh on the downstream side of the filter medium.

Each of the four layers of the filter was approximately 9 inches in length and 60 inches in width. The four-layer element was pleated and shaped into a cylindrical filter having a height of about 9 inches, a diameter of about 2.5 inches, and a circumference of about 8 inches. The polymeric meshes were oriented so that the strands in the machine direction of the polymeric meshes were planar perpendicular to the longitudinal axis of the cylindrical filter. Since the polymeric meshes were pleated in the machine direction, the strands on the bias (i.e., those intersecting the strands oriented in the machine direction) were folded over against themselves in opposite directions within the pleats, thereby preventing the nesting of adjacent strands along the pleat direction. The pleat depth was about 0.47 inch, and the filter had 65 pleats with a total filtration area of about 559 square inches.

EXAMPLE 2

For comparison purposes, a filter also having a glass fiber filter medium as generally described in U.S. Pat. No. 4,734,208 was prepared. Rather than the polymeric meshes, a polyester non-woven spunbonded sheet on the upstream side of the filter medium was provided. The polyester sheet was 9 mils thick and had a nominal basis weight of 1.35 ounces/square yard. The polyester sheet is commercially available as Reemay ® Style 2016 from Reemay (Old Hickory, Tenn.).

Each of the two layers of the filter was approximately 9 inches in length and 100 inches in width. The two-layer element was pleated and shaped into a cylindrical filter having a height of about 9 inches, a diameter of about 2.6 inches, and a circumference of about 8 inches. The pleat depth was about 0.39 inch, and the filter had 125 pleats with a total filtration area of about 903 square inches.

EXAMPLE 3

The performance characteristics of present inventive and conventional filters were evaluated and compared as to the pressure drop through the filter for flow of an actual magnetic coating mix having a viscosity of 800 centipoise as determined by a Rion rotational viscometer using a No. 3 rotor and a No. 3 cup at a rotational speed of 62.5 rpm.

Filter A was the filter of Example 1, while Filter B was the filter of Example 2.

Filter C was a melt-blown cylindrical depth filter of the type which is currently used to filter magnetic coating mixes and had a height of about 10 inches, a diameter of about 2.5 inches, and a circumference of about 8 inches. The filter medium was as described in U.S. Pat. No. 4,726,901 and had a voids volume of about 75%.

The results of the pressure drop test are set forth below:

Filter A: 0.2 kg/cm$^2$
Filter B: 0.3 kg/cm$^2$
Filter C: 2.5 kg/cm$^2$

The results of the test demonstrate the marked superiority of the filter of the present invention as compared to conventional filters presently used to filter highly viscous magnetic coating mixes.

EXAMPLE 4

The performance characteristics of Filters A and B of Example 3 were further evaluated and compared as to the pressure drop through the filter at various flow rates of a test solution having a viscosity of 500 centipoise as determined by a Tokyo Keiki B-type rotational viscometer using a No. 1 rotor at about 20 rpm. Flow rates of 1, 2, and 3 liters per minute (lpm) were employed for purposes of this evaluation, and the test results are set forth below.

|  | 1 lpm | 2 lpm | 3 lpm |
|---|---|---|---|
| Filter A | 0.22 kg/cm$^2$ | 0.44 kg/cm$^2$ | 0.66 kg/cm$^2$ |
| Filter B | 0.88 kg/cm$^2$ | 2.01 kg/cm$^2$ | — kg/cm$^2$ |

These test results demonstrate the superiority of the present inventive filter wherein polymeric meshes are used in conjunction with the glass fiber filter medium.

EXAMPLE 5

The performance characteristics of Filters A and B of Example 3 were also evaluated and compared as to dirt capacity. In particular, the capacity of dirt on the filter before reaching a terminal pressure drop through the filter was determined for each of the filters. A test solution having a viscosity of 500 centipoise as determined by a Tokyo Keiki B-type rotational viscometer using a No. 1 rotor at about 20 rpm and containing 5 grams of AC Fine Test Dust available from AC Spark Plug Division of General Motors (Flint, Mich.) per liter of solution was passed through each of the filters at a rate of 0.82 lpm until the pressure drop reached 4.0 kg/cm$^2$. The amount of dirt removed by each of the filters, as well as the length of time required to reach the terminal pressure drop, was determined, and the test results are set forth below.

|  | Dirt Capacity | Filtration Time |
|---|---|---|
| Filter A | 65 grams | 13.0 minutes |
| Filter B | 30 grams | 8.0 minutes |

These results demonstrate the improved dirt capacity and filtration time until terminal pressure drop with the present inventive filter utilizing the polymeric meshes in addition to the glass fiber filter medium.

While this invention has been described with an emphasis upon a preferred embodiment, it will be obvious to those of ordinary skill in the art that variations in the preferred filter and filtration method may be used an that it is intended that the invention may be practiced otherwise than as specifically described herein. Accordingly, this invention includes all modifications encompassed within the spirit and scope of the invention as defined by following claims.

What is claimed is:

1. A filter for filtering a highly viscous fluid, the filter comprising a pleated filter element which includes a glass fiber filter medium having upstream and downstream sides and a polymeric mesh situated on at least one of the upstream and downstream sides of the filter medium, the polymeric mesh comprising a first set of parallel strands and a second set of parallel strands intersecting the first set at angles of from about 30° to about 75°.

2. The filter of claim 1 wherein the polymeric mesh is on the upstream side of the filter medium.

3. The filter of claim 2 wherein the filter further comprises another polymeric mesh which is situated on the downstream side of the filter medium.

4. The filter of claim 3 wherein the filter medium is a resin-bonded glass fiber filter medium.

5. The filter of claim 1 wherein the strands in the polymeric mesh are oriented to prevent nesting of opposing strands which are folded over against themselves within a pleat.

6. The filter of claim 1 wherein the strands of at least one of the sets of strands extend diagonally with respect to a longitudinal axis of the pleats.

7. The filter of claim 6 wherein the strands of the at least one set contact one another within a pleat.

8. The filter of claim 1 wherein the first and second sets of strands intersect at angles of from about 30° to about 40°.

9. The filter of claim 8 wherein the filter element is substantially cylindrical and has a longitudinal axis and the pleats extend parallel to the longitudinal axis.

10. The filter of claim 9 wherein one set of the parallel strands of the polymeric mesh is oriented perpendicular to the longitudinal axis of the cylindrical filter element.

11. The filter of claim 10 wherein the polymeric mesh has a machine direction and is pleated in the machine direction.

12. The filter of claim 1 wherein the filter further comprises a non-woven sheet disposed between the filter medium and the downstream polymeric mesh.

13. The filter of claim 12 wherein the non-woven sheet comprises a cellulose paper sheet.

14. The filter of claim 12 wherein the non-woven sheet comprises non-woven polymeric fibers.

15. The filter of claim 1 wherein the filter has a pore rating of about 5 micrometers or less.

16. The filter of claim 1 wherein the polymeric mesh has between about 20 and about 50 strands per inch.

17. The filter of claim 16 wherein the polymeric mesh has between about 25 and about 40 strands per inch.

18. The filter of claim 1 wherein one set of the parallel strands contains less strands per inch that the other set of the parallel strands.

19. The filter of claim 18 wherein the polymeric mesh has a machine direction and the set of parallel strands which contains less strands per inch than the other set of the parallel strands is oriented in the machine direction.

20. A method of filtering a highly viscous material comprising passing a material through the filter of claim 1.

21. The method of claim 20 wherein the material comprises a magnetic recording particle mix.

22. The method of claim 20 wherein passing the material through the filter includes removing particulates of approximately 5 micrometers or greater.

23. A filter for filtering highly viscous fluids comprising a pleated filter element including a resin-bonded glass fiber filter medium having upstream and downstream sides, a polymeric mesh situated on the upstream side of the filter medium, a cellulose paper sheet situated on the downstream side of the filter medium, and a polymeric mesh situated on the downstream side of the cellulose paper sheet, wherein the filter element is substantially cylindrical and has longitudinally extending pleats, the filter medium has a pore rating of about 5 micrometers or less, the polymeric mesh comprises a first set of parallel strands of about 25 to about 40 strands per inch and a second set of parallel strands of about 25 to about 40 strands per inch which intersect the first set of strands at angles of about 30° to about 40°, and one set of the parallel strands of the polymeric mesh is oriented perpendicular to the longitudinal axis of the cylindrically configured filter medium, polymeric mesh, and cellulose paper sheet.

24. A method of filtering a material comprising passing a material through the filter of claim 23.

25. The method of claim 24 wherein the material comprises a magnetic recording particle mix.

26. A filter for filtering a highly viscous fluid, the filter comprising a cylindrical pleated filter element having a longitudinal axis and including a glass fiber filter medium having upstream and downstream sides and a polymeric mesh situated on at least one of the upstream and downstream sides of the filter medium, the polymeric mesh comprising a first set of parallel strands oriented perpendicular to the longitudinal axis of the filter element and a second set of parallel strands extending diagonally with respect to the longitudinal axis of the filter element.

27. The filter of claim 26 wherein the strands of the second set contact one another within a pleat.

28. The filter of claim 26 wherein the polymeric mesh has a machine direction and the first set of strands extends in the machine direction.

29. The filter for filtering a highly viscous fluid, the filter comprising a cylindrical pleated filter element including a glass fiber filter medium having upstream and downstream sides and a polymeric mesh situated on at least one of the upstream and downstream sides of the filter medium, the polymeric mesh comprising a first set of parallel strands and a second set of parallel strands, one set of the parallel strands having fewer strands per inch that the other set of parallel strands.

* * * * *